(12) United States Patent
Egigian

(10) Patent No.: US 9,511,705 B1
(45) Date of Patent: Dec. 6, 2016

(54) FRONT MOUNTING, FLUSH, ANCHOR POINT

(71) Applicant: Donald S. Egigian, Borne, TX (US)

(72) Inventor: Donald S. Egigian, Borne, TX (US)

( * ) Notice: Subject to any disclaimer, the term of this patent is extended or adjusted under 35 U.S.C. 154(b) by 0 days.

(21) Appl. No.: 14/608,174

(22) Filed: Jan. 28, 2015

(51) Int. Cl.
*B60P 7/08* (2006.01)

(52) U.S. Cl.
CPC .................. *B60P 7/0807* (2013.01)

(58) Field of Classification Search
CPC ......... B60P 7/0807; B60P 7/08; B60P 7/0876; B61D 45/001; B63B 21/04
USPC .. 410/111, 106, 110, 116; 248/499; 296/167, 296/43
See application file for complete search history.

(56) References Cited

U.S. PATENT DOCUMENTS

| | | | |
|---|---|---|---|
| 3,102,708 A | | 9/1963 | Crain |
| 3,950,010 A | * | 4/1976 | Robertson ..................... 410/110 |
| 4,072,113 A | | 2/1978 | Thurston |
| 4,607,991 A | * | 8/1986 | Porter ........................... 410/110 |
| 4,630,982 A | * | 12/1986 | Fenner .......................... 410/102 |
| 4,699,410 A | * | 10/1987 | Seidel ........................... 294/215 |
| 4,948,311 A | | 8/1990 | St. Pierre |
| D349,036 S | | 7/1994 | Egigian |
| 5,444,897 A | | 8/1995 | Gross |
| D408,267 S | | 4/1999 | Egigian |
| 6,464,437 B1 | | 10/2002 | Elwell |
| 6,533,512 B2 | | 3/2003 | Lin |
| 6,604,898 B2 | | 8/2003 | Price |
| 6,764,259 B1 | | 7/2004 | Preta |
| 6,918,721 B2 | | 7/2005 | Venton-Walters |
| 6,969,219 B2 | | 11/2005 | Speece |
| 7,134,819 B2 | | 11/2006 | Bullock |
| 7,481,610 B1 | * | 1/2009 | Egigian ........................ 410/106 |
| 8,079,793 B2 | * | 12/2011 | Thoma et al. ................ 410/112 |
| 8,388,286 B2 | | 3/2013 | Niklas et al. |
| 8,613,578 B2 | | 12/2013 | Hutchinson |
| 2001/0031187 A1 | | 10/2001 | Goham |
| 2008/0260487 A1 | * | 10/2008 | Grasso .......................... 410/111 |

* cited by examiner

*Primary Examiner* — Glenn Dayoan
*Assistant Examiner* — Sunsurraye Westbrook
(74) *Attorney, Agent, or Firm* — Patent Law & Venture Group; Gene Scott

(57) ABSTRACT

An anchor point is mounted within an aperture of a wall of a molded strip wherein a recessed peripheral shoulder of the aperture receives a flange of the anchor point and fills the aperture flush with a top surface of the molding. A locking plate of the fastening system contacts the recessed shoulder which is therefore clamped between the locking plate and the flange. A ring of the fastening system is movable between an extended position for receiving a line, and a retracted position hidden below the top surface of the molding when not in use.

5 Claims, 8 Drawing Sheets

FRONT MOUNTING, FLUSH, ANCHOR POINT

RELATED APPLICATIONS

This application is related to non-provisional patent application U.S. Ser. No. 13/719,010 filed on Dec. 18, 2012, and claims international date priority thereof as a Continuation-In-Part application. This application describes a similar apparatus and method of use as presented in U.S. Ser. No. 13/719,010 and its subject matter is hereby incorporated herein by reference in its entirety.

BACKGROUND

The disclosed subject matter relates to the field of fastening systems that facilitate securing loads by lashings or lines, and more particularly but not exclusively to fastening systems that have retractable members in order to have an improved appearance and to assure that elements are not a hindrance when not in use. Fastening systems for securing lines are commonly referred to as "tie-down anchor fixtures" or "anchor points" for short, anchor point being used as a noun in herein. In this disclosure we refer to a described tie-down anchor fixture as an anchor point. Such anchor points are known to be used on trailers, pickup trucks, boats and other apparatus to secure loads. An anchor point may be configured to have a member that is retracted when not in use and to be extended when in use to secure lines. In pickup trucks, such anchor points are installed in the side walls of truck beds. A load, placed on the truck bed, is secured against movement using anchor points for securing its lashings or lines. However, such anchor points are conventionally complex, expensive to manufacture, and are not able to be front and flush mounted. The presently disclosed anchor point is relatively simple in construction and use, is relatively inexpensive to manufacture, is flush mountable, has a retractable member and displays a range of other benefits including simplicity of installation by front mounting and tightened, and simple operation. It is durable, and has excellent appearance while being essentially invisible when not in use.

In light of the foregoing discussion, there is a need for such an improved anchor point as summarized, discussed in detail, and claimed in the following text and accompanying illustrations.

SUMMARY

In embodiments of the described and illustrated anchor points, fastening systems facilitating securing of loads are described. Such fastening systems may include parts: a front housing a locking plate, a rear housing, a u-shaped anchor ring with a locking pin. A simple pair of screws and receiving threads secures these parts together. A pair of legs of the anchor ring extend through clearance holes in the several parts so that the anchor ring is able to slide between an extended position for lashing and a retracted position. The anchor ring has a detente spring for holding it in the extended position where the spring force is easily overcome manually for stowing the anchor ring out of sight. The anchor point may be flush mounted in a truck side rail or decorative strip on top of the side rail where it is essentially out of sight when not in use.

The following detailed description includes references to the accompanying illustrations which form a part of this detailed description. Example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of what is defined and claimed. The following detailed description is, therefore, not to be taken as a limiting sense, and the scope is defined by the appended claims and their equivalents which are to be understood in their broadest possible sense.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated.

BRIEF DESCRIPTION OF THE DRAWINGS

Embodiments of the described apparatus are illustrated by way of example in the figures of the accompanying drawing sheets, in which like references indicate similar elements and in which.

DETAILED DESCRIPTION

This disclosure relates to an anchor point 10, shown in FIGS. 1-8 for securing straps, cords, ropes, wires and similar fastening materials which, in general may be referred to as "lines." Anchor point 10 may be used as a tie-down fastening point on a vehicle such as an open bed truck or similar apparatus where one or more of said anchor point 10 receives one end of a line tied to it with the loose end of the line tied to a load for securing the load, that is, preventing it from shifting during transport. Anchor point 10 may also be used in any situation where a fastening point for a line is required.

Figure 1:
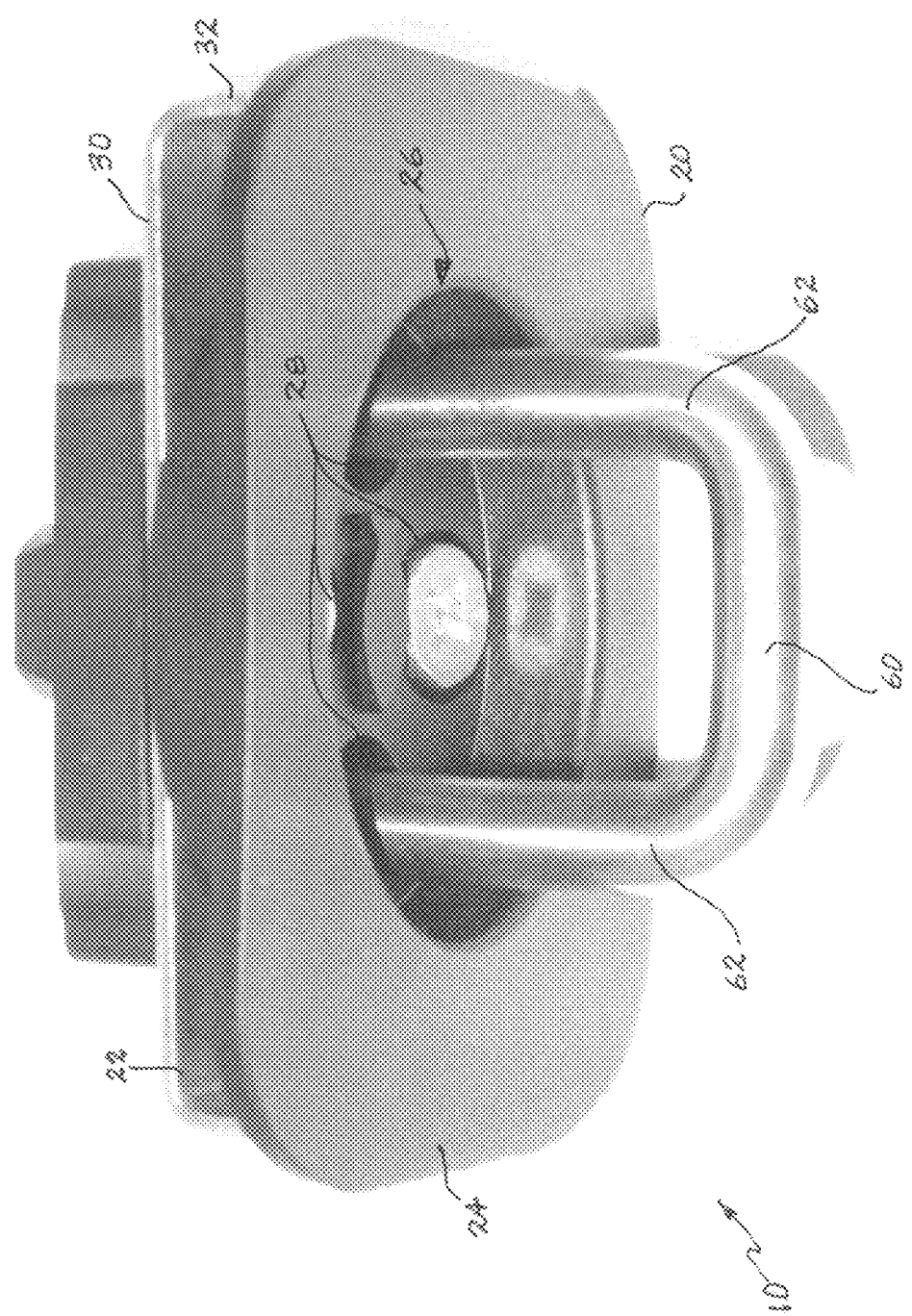
FIG. 1 is a perspective front view of an anchor point fully assembled as described.
Figure 2:
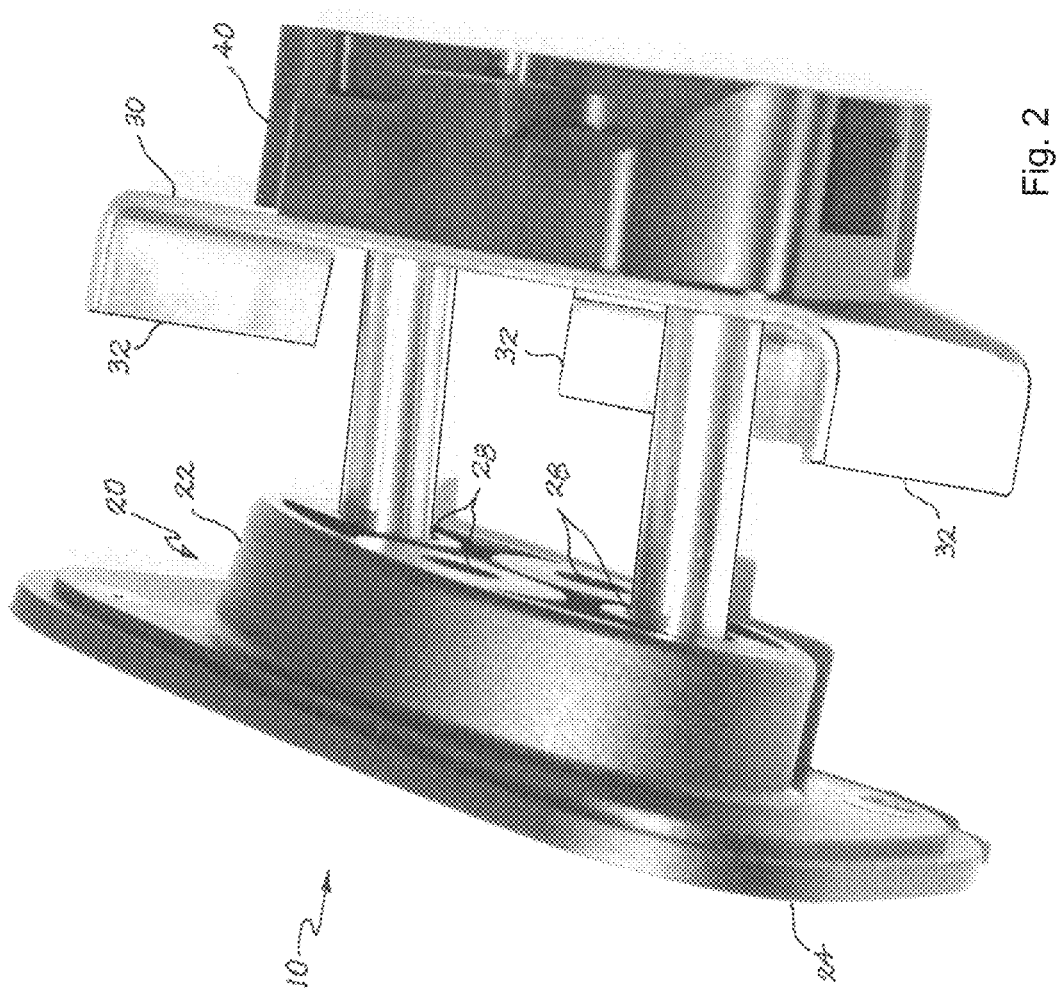
FIG. 2 is a perspective side view thereof shown partially disassembled.

In embodiments, anchor point 10 may be an assembly made up of several separate parts as shown in FIG. 2 and as described below, where said parts may be assembled to complete a fully functioning apparatus. A front housing 20 may have a body 22 with a flange 24, and may have a recess 26, the recess 26 encompassing both the flange 24 as well as the body 22. Two pairs of a first clearance hole 28 may be placed within the recess 26 penetrating through the body 22. The body 22 and flange 24 of front housing 20 may be molded or otherwise produced as a single integrated part.

Figure 3:
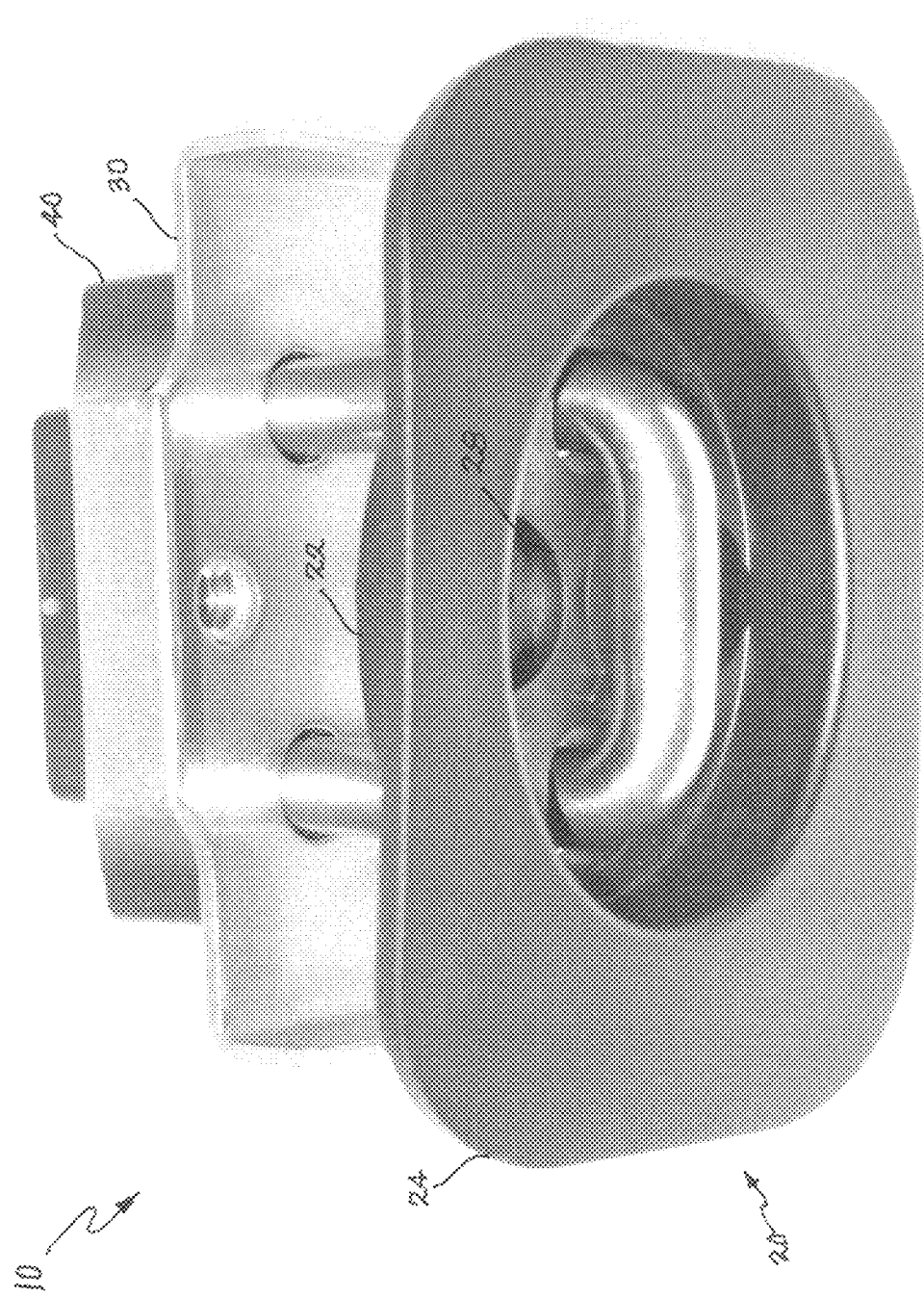
FIG. 3 is a perspective front view thereof shown partially disassembled.

In embodiments, shown in FIG. 2, a generally planar locking plate 30 may have plural turned-up edges 32 on three or four sides, and may further have two pairs of a second clearance hole 36 as shown in FIG. 3. Locking plate 30 may be made of a metal as for instance by stamping, or may be a molded part or made by other means.

Figure 4:
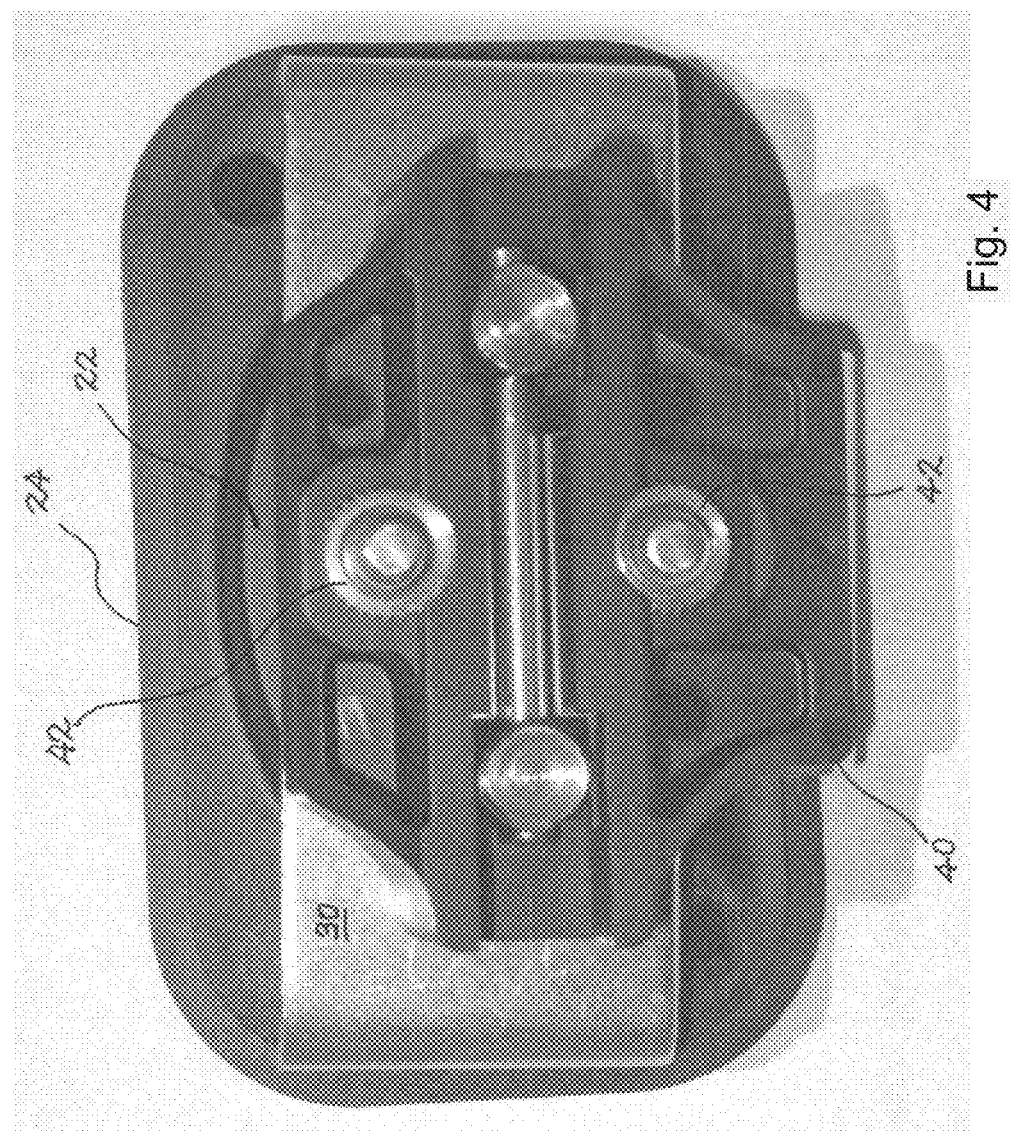
FIG. 4 is rear elevation view thereof.
Figure 8:
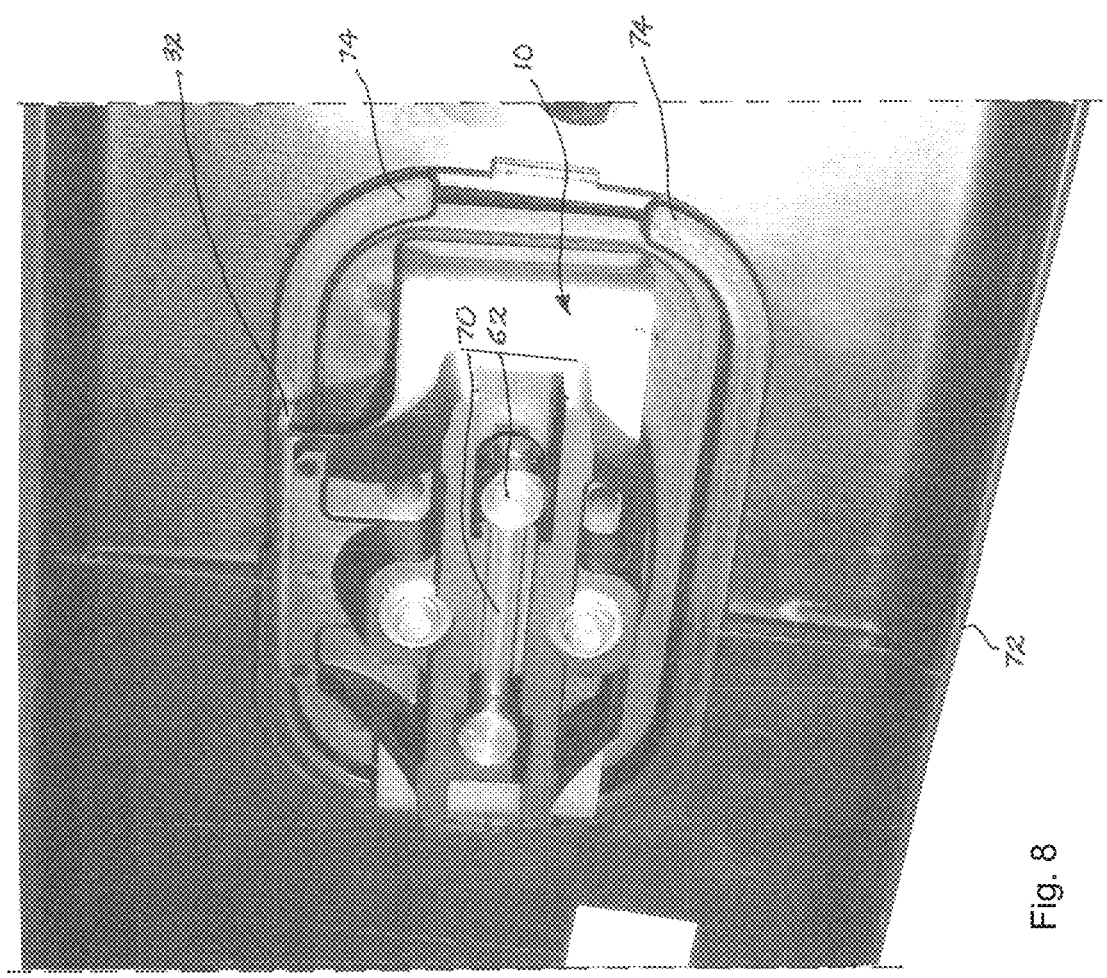
FIG. 8 is a perspective view of a rear side of the panel of FIG. 6 with the anchor point mounted within the aperture.

In embodiments, a rear housing 40 may have a pair of integrated threaded holes or may have threaded inserts 42 as shown in FIG. 4, and further may have a pair of a third clearance hole 44, as well as a slot 46 as best seen in FIG. 8. Rear housing 40 may be a molded part and if inserts 42 are used, as shown, they may be co-molded into rear housing 40 or pressed into molded holes after molding.

Figure 5:
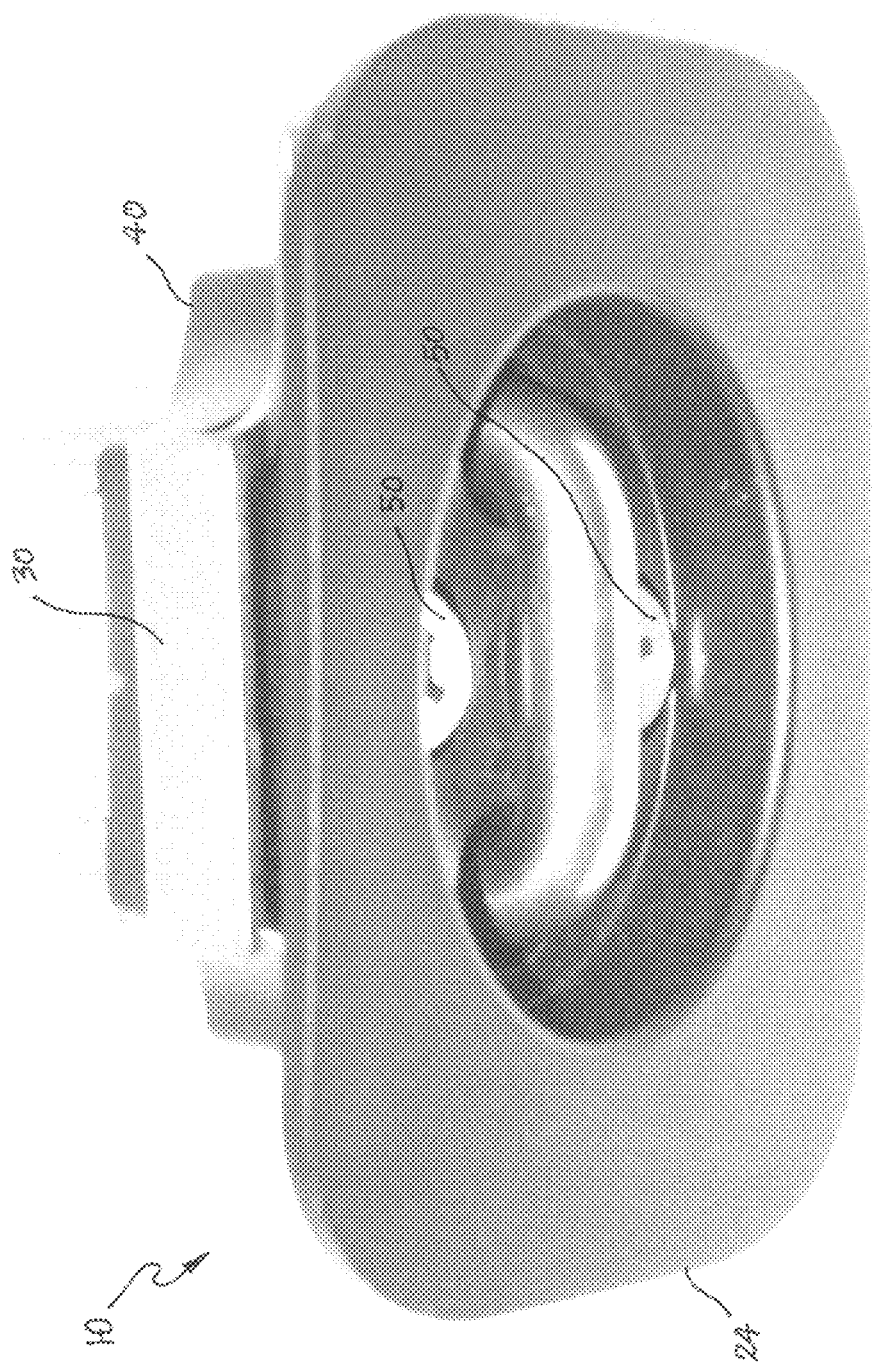
FIG. 5 is a further perspective front view thereof showing screw fasteners in place.

In embodiments, a pair of machine screws 50 as shown in FIG. 5, may be engaged through a pair of the first clearance holes 28, and through a pair of the second clearance holes 36, and then threaded into the pair of threaded holes or into threaded inserts 42 so as to hold the front housing 20, the locking plate 30, and the rear housing 40 together as an integral assembly. FIG. 4 shows the terminal ends of screws 50 as engaged with threaded inserts 42.

In embodiments, a U-shaped anchor ring 60 may have a pair of legs 62 joined together by an integral portion, that is, anchor ring 60 may be made from a single piece of solid stock, preferably metal, but may be of other materials and may be of round or rectangular stock. A locking pin 70 may be engaged with terminal ends 66 of the pair of legs 62 as shown in FIG. 4. The pair of legs 62 may be positioned through further pairs of the first clearance holes 28, second clearance holes 36, and third clearance holes 44. The anchor ring 60 may therefore be movable between a retracted position shown in FIG. 3, and an extended position shown in FIG. 1 wherein the integral portion is hidden within recess 26 when anchor ring 60 is in its retracted position and extends out from recess 26 when anchor ring 60 is in its extended position.

Figure 6:
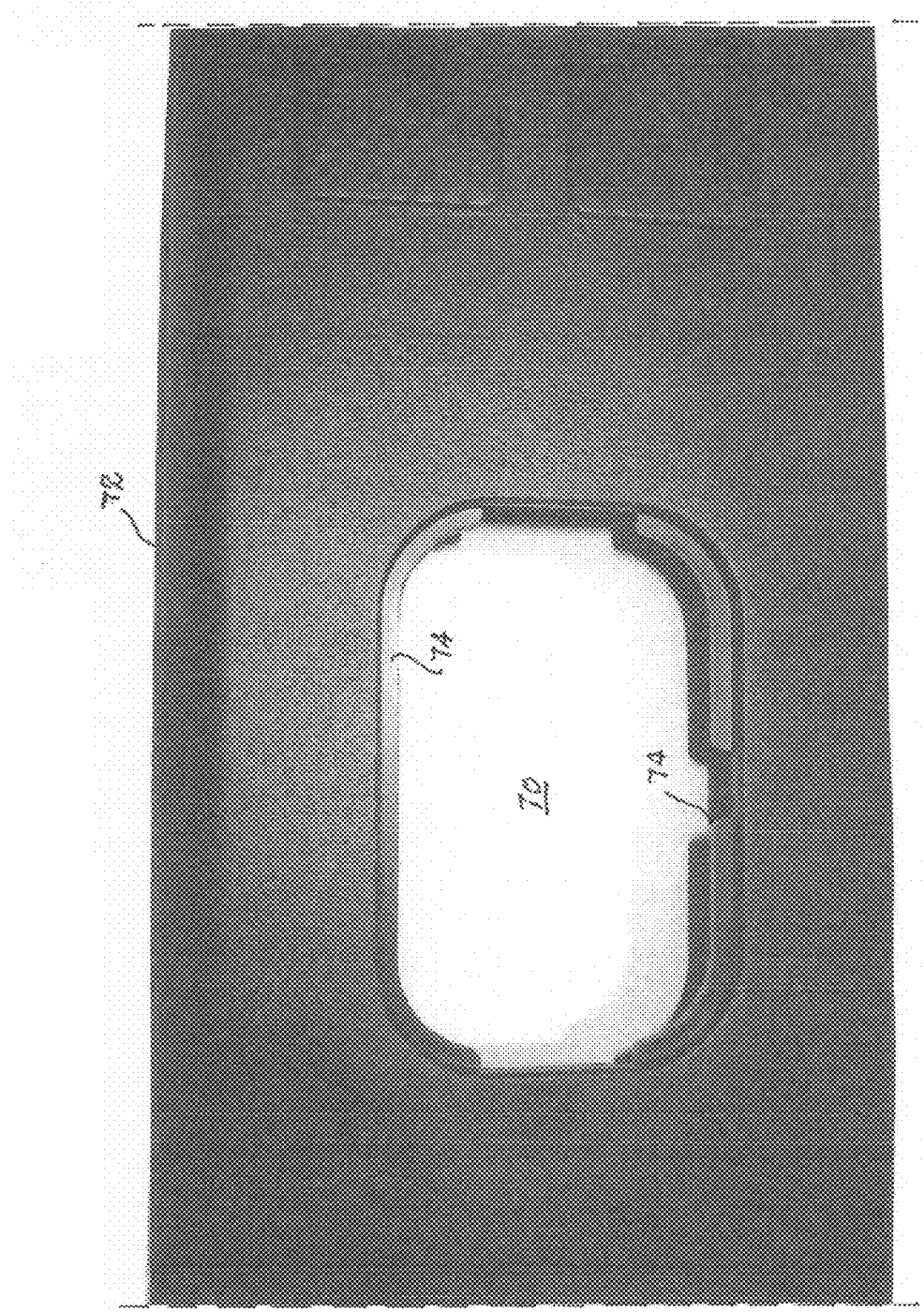
FIG. 6 is a plan view of a front side of a decorative panel having an aperture therein.
Figure 7:
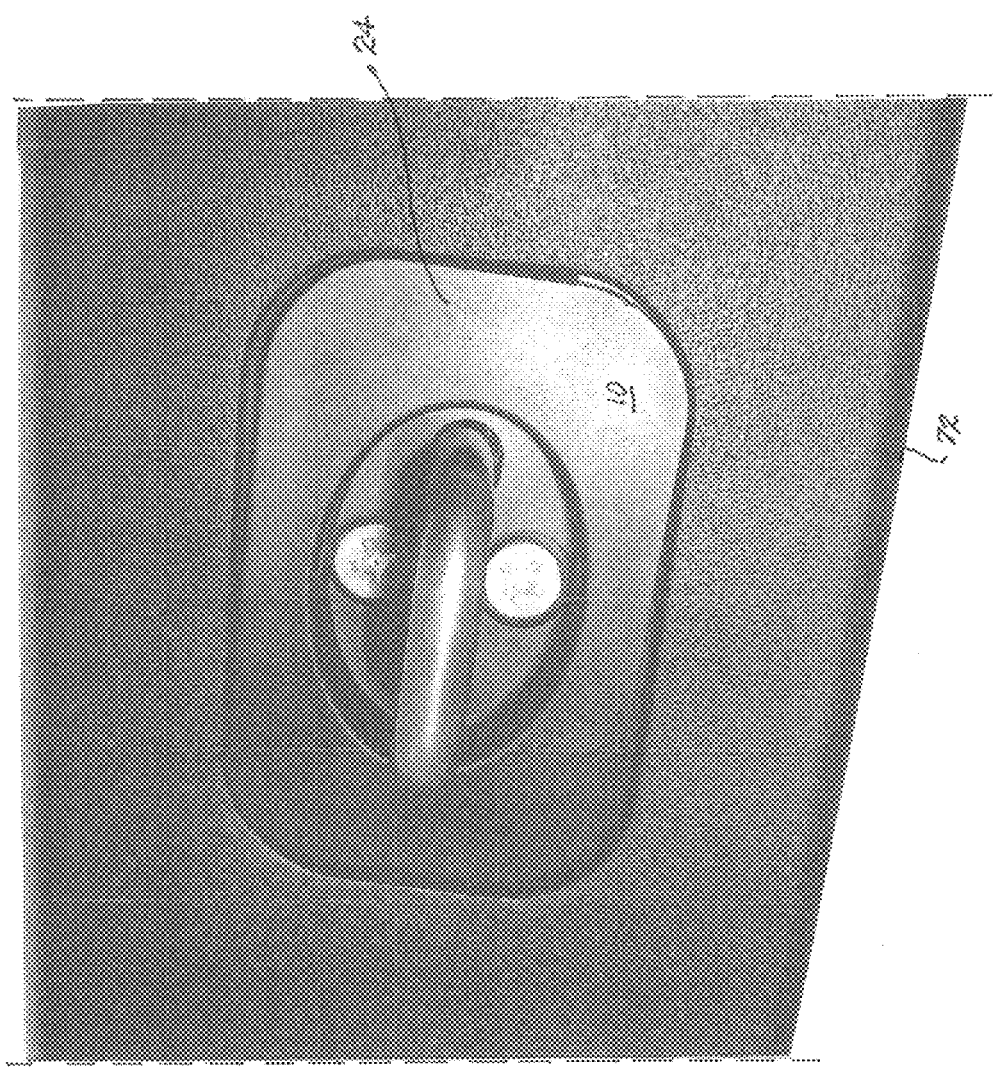
FIG. 7 is a perspective view of the front side of the panel of FIG. 6 with the anchor point mounted within the aperture.

In embodiments, the anchor point 10 may be mounted in an access aperture 70 in a structural wall 72 as shown in FIG. 6 such as in the exemplary decorative molded strip or panel shown as shortened at left and right in the figure by dashed lines. Such an access aperture 70, may have a recessed peripheral shoulder 74 and with anchor point 10 installed in access aperture 70, as shown in FIG. 7, flange 24 of body 22 may rest on the recessed peripheral shoulder 74 and may have a thickness such that it is flush with a top surface 76 of wall 72 while fully filling access aperture 70. One or more of the plural turned-up edges 32 of locking plate 30 may be drawn into contact with recessed peripheral shoulder 74 from below as shown in FIG. 8 wherein recessed peripheral shoulder 74 is clamped between the one or more of the turned-up edges 32 and flange 24 thereby securing anchor point 10 to structural wall 72 where it will not pull out due to tension in an attached line. It is noted that although the turned up edges 32 of locking plate 30 have a greater span than the opening formed by peripheral shoulder 74, it is possible to front mount anchor point 10 as shown in FIG. 2 by angling turned-up edges 32 under peripheral shoulder 74 one at a time.

In the foregoing description, embodiments are described as a plurality of individual parts, and this is solely for the sake of illustration. Accordingly, it is contemplated that some additional parts may be added, some parts may be changed or omitted, and the order of the parts may be re-arranged, without leaving the sense and understanding of the apparatus as claimed.

What is claimed is:

1. An anchor point for securing lines, said anchor point comprising:
    a front housing having a recess therein, and within said recess, two pairs of a first clearance holes;
    a locking plate having three turned-up edges and two pairs of a second clearance holes;
    a rear housing having receivers, a pair of a third clearance holes, and a slot;
    a U-shaped anchor ring having a pair of legs joined together by an integral cross-portion;
    a locking pin engaged with terminal ends of said pair of legs;
    a pair of screws within a pair of said first clearance holes and a pair of said second clearance holes, and engaged with said receivers;
    said pair of legs of said anchor ring positioned through a further pair of said first clearance holes, a further pair of said second clearance holes, and said pair of third clearance holes;
    said anchor ring movable between a retracted position wherein said cross-portion is within said recess and an extended position wherein said cross-portion extends from said front housing.

2. The anchor point of claim 1 further comprising a structural wall having a top surface with an aperture therein, said aperture having a recessed peripheral shoulder, said body resting on said recessed peripheral shoulder and filling said aperture flush with said top surface, and at least two of said plural turned-up edges of said locking plate in contact with said recessed peripheral shoulder wherein said recessed peripheral shoulder is clamped between said at least two of said plural turned-up edges and said body.

3. An anchor point comprising:
    a front and rear housings having a locking plate sandwiched there between, said housings and said locking plate secured together by common hardware;
    said locking plate having three turned up edges;
    an anchor ring penetrating said housings and locking plate and movable between a retracted position within a recess in said front housing and an extended position.

4. The anchor point of claim 3 further comprising a structural wall having a top surface, and an aperture there through, said aperture having a recessed peripheral shoulder, said front housing resting on said recessed peripheral shoulder and extensive for filling said aperture flush with said top surface of said structural wall, and at least two of said turned-up edges of said locking plate in contact with said recessed peripheral shoulder wherein said recessed peripheral shoulder is clamped between said turned-up edges and said front housing.

5. An anchor point comprising:
    a housing;
    an anchor ring penetrating said housing and movable between a retracted position within a recess in said housing and an extended position;
    a structural wall having a top surface, and an aperture there through, said aperture having a recessed peripheral shoulder wherein a flange of said housing rests and is flush with said top surface; and
    a locking plate wherein three turned up edges are in contact with said recessed peripheral shoulder wherein said recessed peripheral shoulder is clamped between said turned up edges of said locking plate and said housing.

* * * * *